(12) United States Patent
Cowan

(10) Patent No.: US 8,003,183 B1
(45) Date of Patent: Aug. 23, 2011

(54) LABEL STRUCTURE INCORPORATING A LEAFLET FOR USE ON SMALL CONTAINERS

(76) Inventor: Randy G Cowan, Sioux Falls, SD (US)

( * ) Notice: Subject to any disclaimer, the term of this patent is extended or adjusted under 35 U.S.C. 154(b) by 0 days.

(21) Appl. No.: 12/750,820

(22) Filed: Mar. 31, 2010

Related U.S. Application Data

(63) Continuation-in-part of application No. 12/430,217, filed on Apr. 27, 2009, which is a continuation-in-part of application No. 11/890,335, filed on Aug. 6, 2007, now Pat. No. 7,947,351.

(51) Int. Cl.
*B32B 9/00* (2006.01)
*B32B 33/00* (2006.01)
*B42D 15/00* (2006.01)

(52) U.S. Cl. ........ 428/40.1; 428/41.7; 283/72; 283/100; 283/101; 283/106

(58) Field of Classification Search .................. 428/40.1, 428/41.7, 41.8, 42.1–43; 283/72, 81, 100, 283/101, 103–106
See application file for complete search history.

(56) References Cited

U.S. PATENT DOCUMENTS

| | | |
|---|---|---|
| 3,971,866 A | 7/1976 | Johnson |
| 4,609,589 A | 9/1986 | Hosoda |
| 4,621,837 A | 11/1986 | Mack |
| 4,930,812 A | 6/1990 | Howard |
| 4,991,878 A | 2/1991 | Cowan |
| 5,021,273 A | 6/1991 | Kobayashi |
| 5,074,595 A | 12/1991 | Hill |
| D327,709 S | 7/1992 | Hagen |
| 5,154,956 A | 10/1992 | Fradrich |
| 5,200,243 A | 4/1993 | Van Veen |
| 5,234,735 A | 8/1993 | Baker |
| 5,263,743 A | 11/1993 | Jones |
| 5,290,616 A | 3/1994 | Cowan |
| 5,324,559 A | 6/1994 | Brombacher |
| 5,399,403 A | 3/1995 | Instance |
| 5,403,636 A | 4/1995 | Crum |
| 5,439,721 A | 8/1995 | Pedroli |
| 5,507,901 A | 4/1996 | Limina |
| 5,587,222 A | 12/1996 | Hoffmann |
| 5,588,239 A | 12/1996 | Anderson |
| 5,674,334 A | 10/1997 | Instance |

(Continued)

FOREIGN PATENT DOCUMENTS

EP  0506202  9/1992

(Continued)

*Primary Examiner* — Patricia L Nordmeyer
(74) *Attorney, Agent, or Firm* — Jeffrey A. Proehl; Woods, Fuller, Shultz & Smith, PC

(57) ABSTRACT

A label structure is disclosed for mounting on a container and includes a base panel for affixing to a surface of the container. An adhesive is applied to at least a portion of a rear face of the base panel for adhering the base panel to the container. The label structure further includes a leaflet associated with the base panel for application to the container with the base panel, and the leaflet comprising at least one panel with opposite faces. The label structure also includes a laminating strip securing the leaflet to the base panel, and the laminating strip overlies the leaflet and overlying the base panel. In some embodiments, the leaflet is positioned adjacent to the base panel, with a first portion of the leaflet overlying the base panel and a second portion of the leaflet not overlying the base panel.

20 Claims, 20 Drawing Sheets

U.S. PATENT DOCUMENTS

| | | |
|---|---|---|
| 5,736,212 A | 4/1998 | Fischer |
| 5,738,382 A | 4/1998 | Grosskopf |
| 5,804,271 A | 9/1998 | Barry |
| 5,863,628 A | 1/1999 | Barry |
| 5,866,219 A | 2/1999 | McClure |
| 5,951,054 A | 9/1999 | Hagen |
| 5,972,455 A | 10/1999 | Barry |
| 6,027,598 A | 2/2000 | Anderson |
| 6,027,780 A | 2/2000 | Treleaven |
| 6,057,019 A | 5/2000 | Barry |
| 6,120,637 A | 9/2000 | Barry |
| 6,210,767 B1 | 4/2001 | Knauf |
| 6,213,520 B1 | 4/2001 | Treleaven |
| 6,254,137 B1 | 7/2001 | Baum |
| 6,306,476 B1 | 10/2001 | Barry |
| 6,329,034 B1 | 12/2001 | Pendry |
| 6,398,263 B2 | 6/2002 | Treleaven |
| 6,413,345 B1 | 7/2002 | Treleaven |
| 6,432,500 B1 | 8/2002 | Jones |
| 6,439,614 B1 | 8/2002 | Cowan |
| 6,447,862 B1 | 9/2002 | Rankin |
| 6,531,023 B1 | 3/2003 | Barry |
| 6,541,090 B2 | 4/2003 | Grosskopf |
| 6,645,592 B1 | 11/2003 | Cowan |
| 6,669,804 B2 | 12/2003 | Pendry et al. |
| 7,077,435 B1 | 7/2006 | Cowan |
| 7,179,514 B2 | 2/2007 | Olsen |
| 7,357,422 B2 | 4/2008 | Seidl |
| 2001/0004152 A1 | 6/2001 | Treleaven |
| 2001/0011821 A1 | 8/2001 | Lind |
| 2004/0217022 A1 * | 11/2004 | Irvine et al. .................. 206/223 |

FOREIGN PATENT DOCUMENTS

| | | |
|---|---|---|
| EP | 0833295 | 9/1997 |
| GB | 2006713 | 5/1979 |
| GB | 2220886 | 1/1990 |
| WO | 9204704 | 3/1992 |
| WO | 9807131 | 2/1998 |

* cited by examiner

LABEL STRUCTURE INCORPORATING A LEAFLET FOR USE ON SMALL CONTAINERS

REFERENCE TO RELATED APPLICATIONS

This application is a continuation-in-part of my patent application Ser. No. 12/430,217, filed Apr. 27, 2009, which is a continuation-in-part of my patent application Ser. No. 11/890,335, filed Aug. 6, 2007, now U.S. Pat. No. 7,947,351, both of which are incorporated herein by reference in their entireties.

BACKGROUND OF THE INVENTION

1. Field of the Invention

The present invention relates to labels incorporating leaflets and more particularly pertains to a new label structure that incorporates a leaflet that is highly suitable for use on containers with relatively small exterior dimensions.

2. Description of the Prior Art

Applying informational and instructional labels to containers is known in the art. In container applications where relatively large amount of information need to be associated with the container, small leaflets and booklets have been incorporated into the labels to provide sufficient area for text and other information that would not otherwise practically fit on the label.

However, the packaging of pharmaceuticals presents unique challenges to common and accepted product packaging techniques. Unlike many products that are packaged in relatively large containers (such as, for example, agricultural products in gallon or larger jugs), pharmaceuticals such as pills or liquids are typically packaged in relatively much smaller containers. The small containers are typically less than about five or six inches tall, and much of that height is taken up by the lid and the constricted neck portion of the container, so that very little of the overall height of the container is available to adhered the label. This reduced amount of "real estate" on the surface of the container makes it difficult if not impossible to include all required information about the contents on a simple label. The typical approach has been to employ the aforementioned leaflets or booklets with the containers. However, the small containers used to hold pharmaceuticals, for example, typically have a horizontal cross section that is substantially round or square in shape, and this cross section in many cases may not exceed approximately 2 inches in the largest dimension. This relatively small cross section size typically produces small radiuses to which a label applied to the container needs to conform. As a result, labels that are relatively stiffer are more difficult to apply to the small radius of the small container and, once applied, are more difficult to keep adhered to the container. This is especially a problem for labels that incorporate a leaflet that includes several leaves or panels, which do not conform well to the curves of the containers. Even if the leaflet can be attached to the small container, the small size of the container, and as a result the small size of the panels of the leaflet, places a significant limit on the amount of information that can be accommodated on the leaflet. These factors can make the use of labels incorporating leaflets on small containers very difficult and unsuitable for containing the large amounts of information often associated with pharmaceuticals.

The conventional thinking has been to associate a separable folded leaflet with the container. One approach has been to adhere the leaflet directly to the surface of the container (or the cap of the container). This approach can result in the leaflet being vulnerable to loss from the container if the leaflet is not adequately and securely adhered, while the size (and thus the information holding capacity) of the leaflet is still highly limited. Another approach has been to place the container in a separate box or package and place the insert inside the box with the container. This approach suffers from the significant additional cost and bulk that results from the extra packaging. Yet another approach has been to apply a single layer label to the bottle with a portion of the information printed on the single layer label, and then to apply a separate folded "leaflet" to the single layer label, typically by adhering the leaflet to the outer face of the label on the container with a limited spot of adhesive, which may not adequately secure the leaflet to the label.

Each of these approaches has the drawback of being a relatively time and labor intensive procedure, as they are typically performed at the time that the containers are filled (rather than when the label is produced) by the pharmaceutical company. These approaches also require a strict reconciliation scheme to be implemented by the pharmaceutical company to assure that the number of leaflets matches the number of containers. For example, verification must be made that equal numbers of labels and leaflets are applied to an equal number of the containers, so that one or more of the containers are not shipped missing a leaflet. If a reconciliation between the number of labels applied and the number of leaflets applied is not achieved, such as when more labels are used in the process than leaflets applied, then a laborious process of checking the containers must be performed if the affected batch of containers is still within the filling and labeling facility. In some cases, a recall of the unreconciled batch of containers is required if the batch of containers has already left the facility. The reconciliation process thus adds considerable effort and risk to the container filling and labeling process, as it requires strict bookkeeping practices.

It is therefore believed that there is a need for a label structure system that is suitable for including large amounts of printed information on a small container through the use of a leaflet that avoids the need for a reconciliation procedure, as well as removes the burden of applying the leaflet to the label from the pharmaceutical manufacturer.

SUMMARY OF THE INVENTION

In view of the foregoing disadvantages inherent in the known types of labels incorporating leaflets now present in the prior art, the present invention provides a new label structure incorporating a leaflet for use on small containers wherein the same can be utilized for use on containers with relatively small exterior dimensions.

In one implementation, a label structure is disclosed for mounting on a container having a container body with an opening and a cap removably closing the opening. The label structure may comprise a base panel for affixing to exterior surfaces of the container. The base panel has a front face and a rear face, and an adhesive may be applied to at least a portion of the rear face of the base panel for adhering the base panel to the container. The base panel may include an upper portion for positioning adjacent to the cap of the container and a lower portion for positioning adjacent to the container body of the container. A leaflet may be secured to the base panel for application to the container with the base panel, and the leaflet may comprise at least one panel, the leaflet overlying the upper and lower portions of the base panel. The upper portion of the base panel may be separable from the lower portion of the base panel to permit removal of the cap from the container body when the upper portion is affixed to the cap and the lower portion is affixed to the container body.

In another implementation, a container and label structure combination is disclosed that may comprise a container comprising a container body with an opening and a cap removably closing the opening, with the container body having an exterior surface and the cap having an exterior surface. A label structure on the container may comprise a base panel for affixing to the exterior surfaces of the container, with the base panel having a front face and a rear face. An adhesive may be applied to at least a portion of the rear face of the base panel for adhering the base panel to the container. The base panel may include an upper portion positioning affixed to the exterior surface of the cap of the container and a lower portion affixed to the exterior surface of the container body of the container. A leaflet may be secured to the base panel and may comprise at least one panel. The upper portion of the base panel may be separable from the lower portion of the base panel to permit removal of the cap from the container body.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

A significant advantage of the present invention is the ability to provide a small container with a label structure that incorporates a leaflet that is suitable for mounting and remaining adhered to the small container with an outer surface with a relatively small radius of curvature. The present invention also facilitates the incorporation of a significant amount of information on the label structure that was not possible on heretofore known label structures, especially in embodiments of the invention that incorporate an oversized leaflet.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
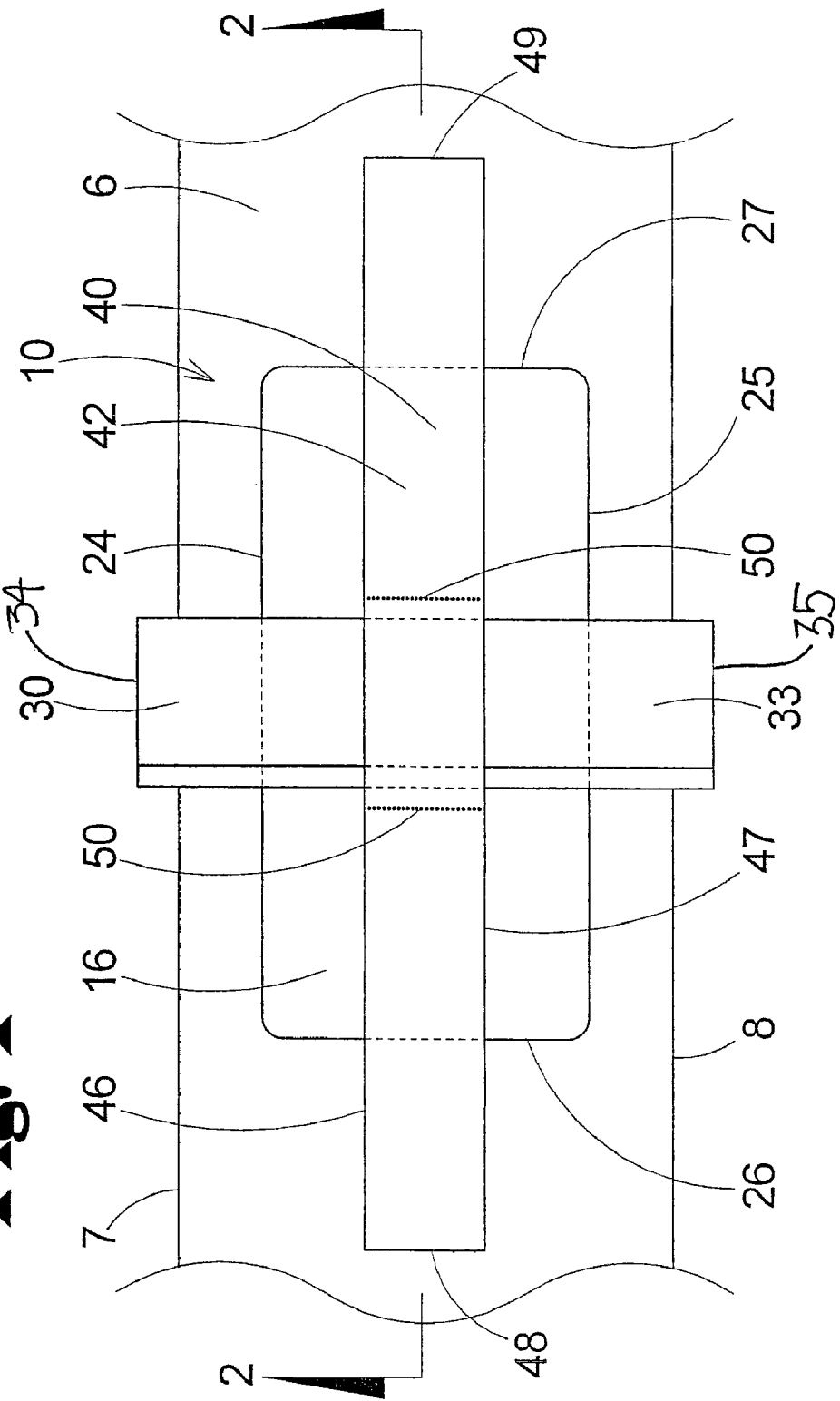
FIG. 1 is a schematic front view of an embodiment of the label structure according to the present invention.
Figure 2:
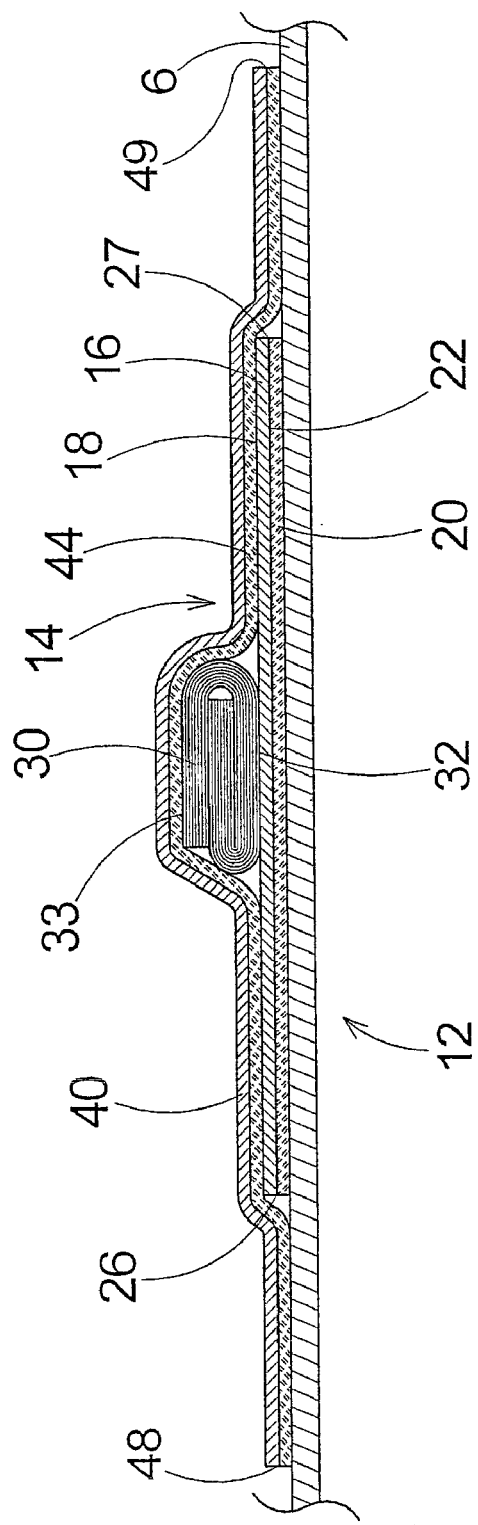
FIG. 2 is a schematic sectional view of the embodiment of FIG. 1 of the present invention taken along line 2-2 of FIG. 1.
Figure 3:
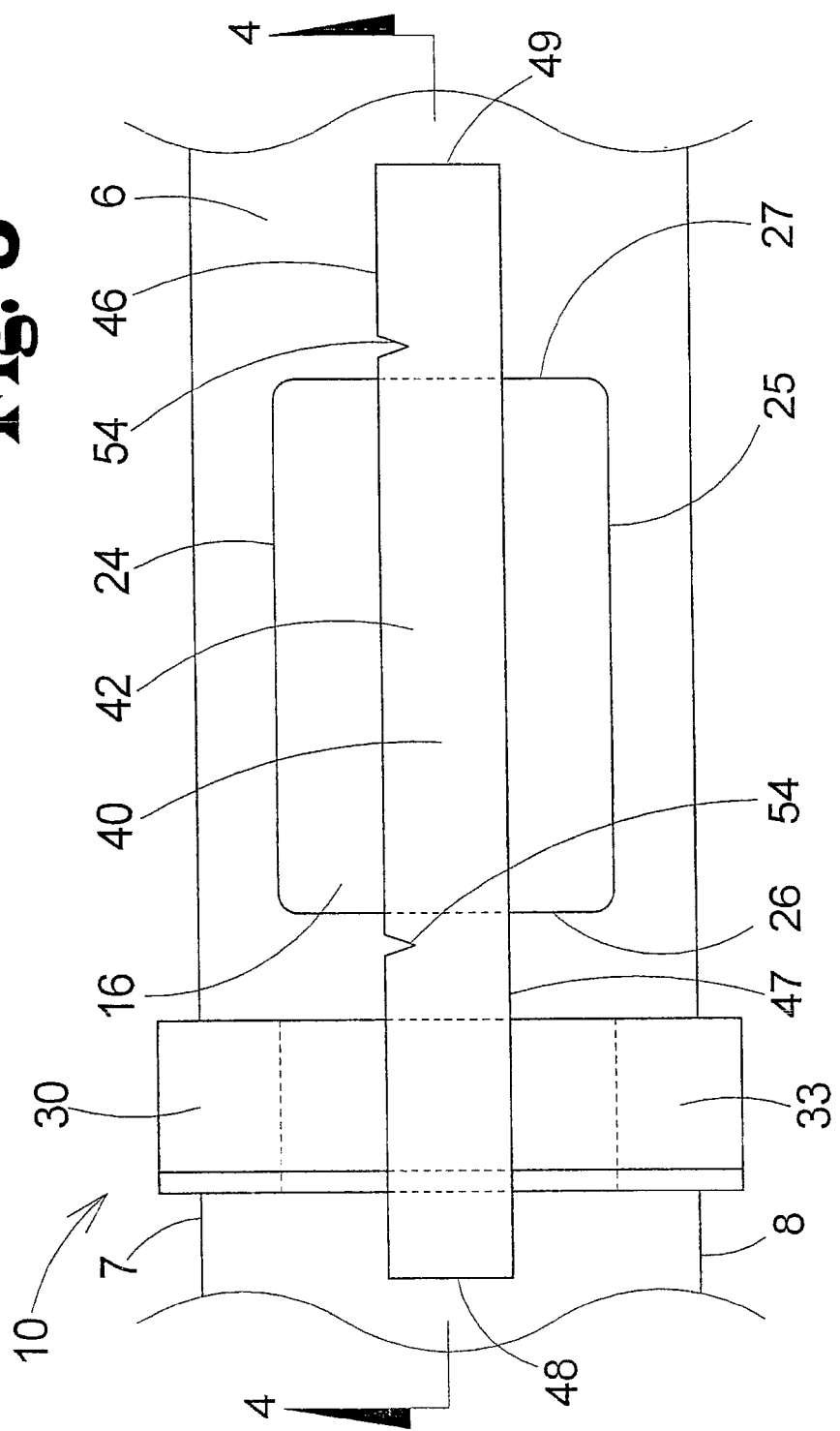
FIG. 3 is a schematic front view of another embodiment of the label structure according to the present invention.
Figure 4:
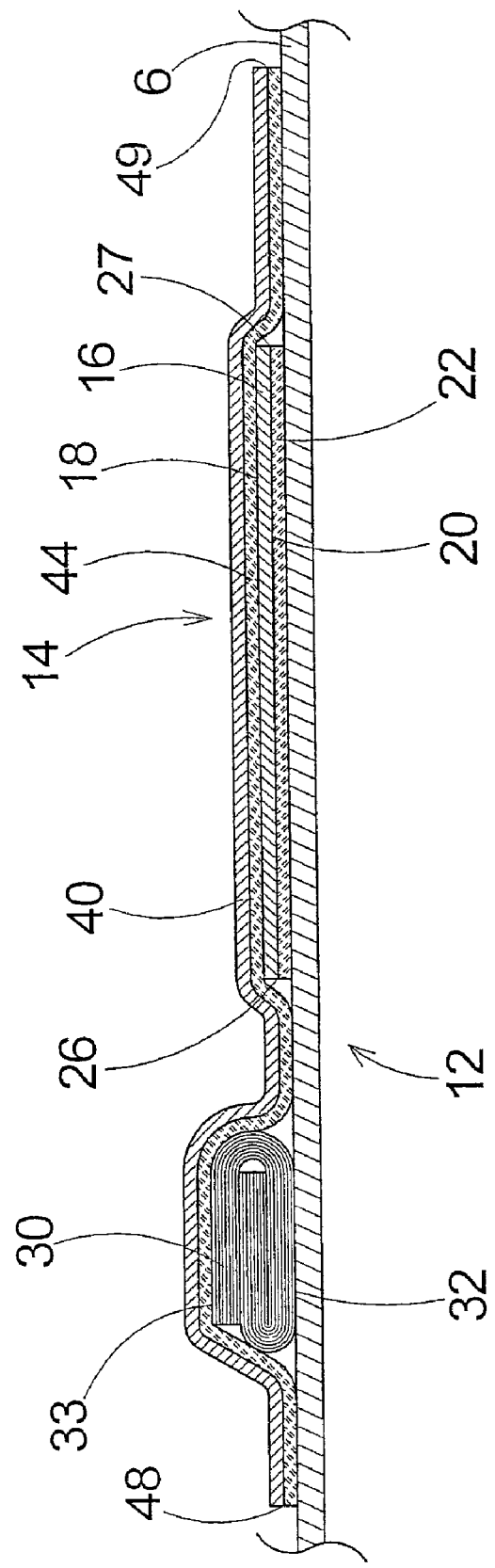
FIG. 4 is a schematic sectional view of the embodiment of FIG. 3 of the present invention taken along line 4-4 of FIG. 3.
Figure 5:
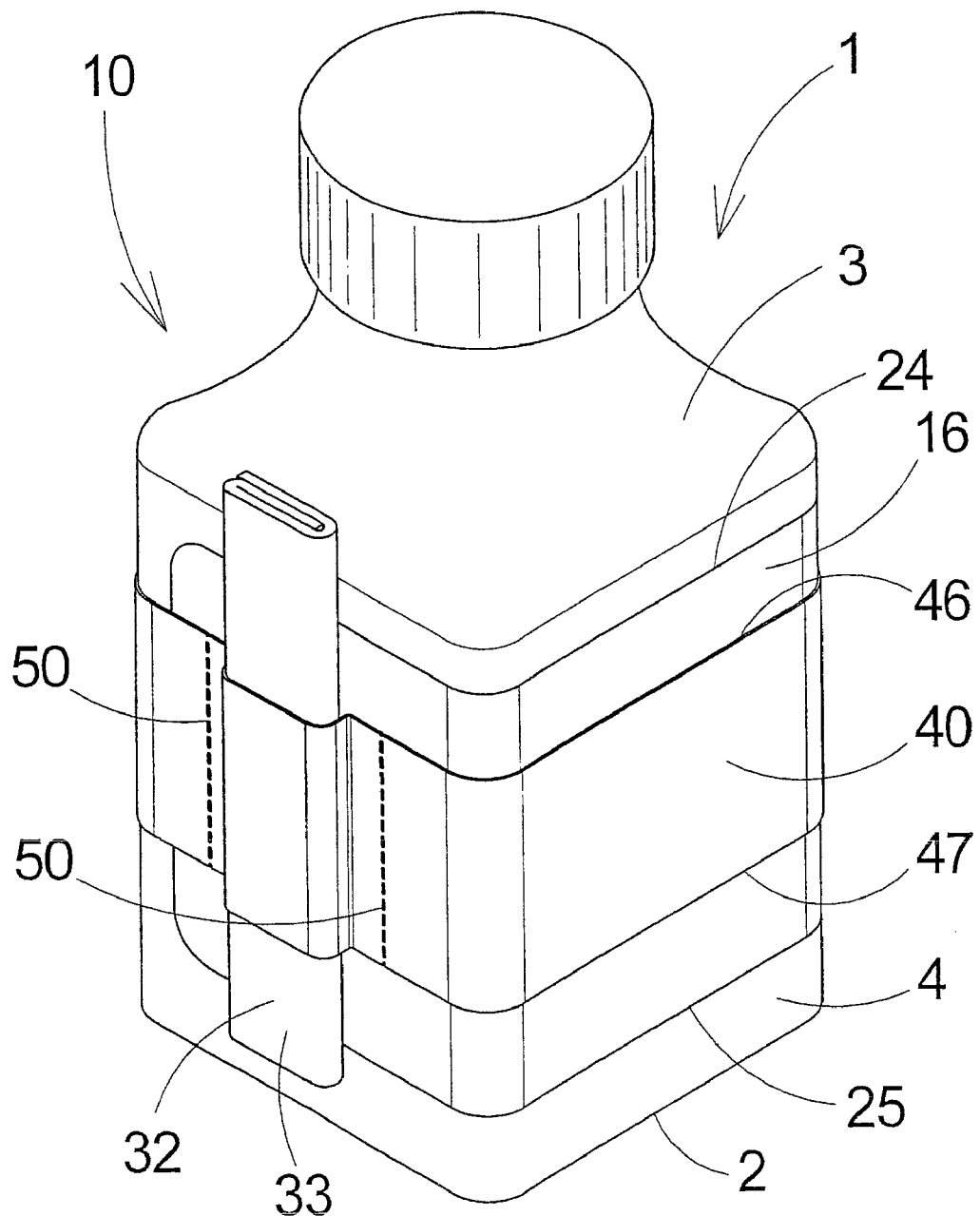
FIG. 5 is a schematic perspective view of the embodiment of the present invention of FIG. 1.
Figure 6:
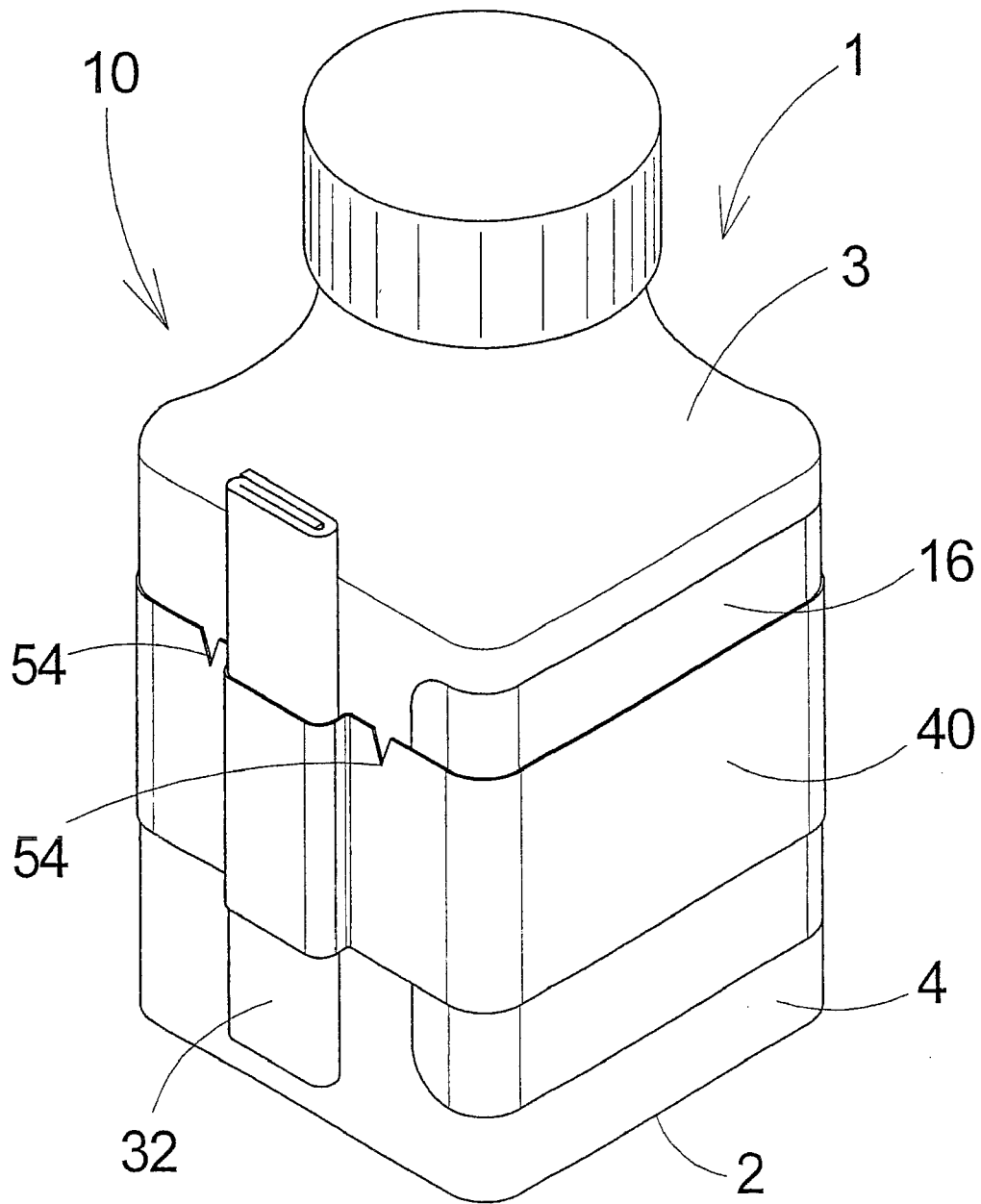
FIG. 6 is a schematic perspective view of the embodiment of the present invention of FIG. 3.

With reference now to the drawings, and in particular to FIGS. 1 through 23 thereof, a new label structure incorporating a leaflet for use on small containers, that embodies the principles and concepts of the present invention and generally designated by the reference numeral 10, will be described.

The label structure 10 of the invention is highly suitable for use on a container 1 having a bottom 2 on which the container is normally rested, a top 3 that is located opposite of the bottom 2, an opening in the container 1 that is located toward the top 3 and provides access to the interior of the container. A perimeter wall 4 of the container 1 extends upwardly from the bottom 2 toward the top 3. The perimeter wall 4 is typically substantially tubular, and in some configurations has a substantially circular cross section, while in other configurations the tubular perimeter wall has a substantially rectangular cross section. The cross section of the tubular perimeter wall 4 may have a maximum width, and the maximum width may be within a range of approximately 1 inch to approximately 2 inches or more.

For the purpose of this description, the label structure 10 has a rear 12 that is intended to be positioned adjacent to (and face) a surface of the container 1 and is typically adhered to the surface when the label structure is applied to the container. The label structure 10 also has a front 14 which is directed away from (and faces away from) the container 1 when (the rear of) the label structure is adhered to the container. "Rearward" is used to indicate a direction that is toward the rear 12 of the label structure 10, and toward the container 1 when the label structure is applied to the container. "Forward" is used to indicate a direction that is toward the front 14 of the label structure 10, and away from the container 1 when the label structure is applied to the container.

The label structure 10 may be carried on a carrier liner 6 that may be provided to carry a plurality of the label structures 10. The carrier liner 6 may be elongate with a longitudinal axis that extends along a length of the carrier liner. The carrier liner 6 has lateral side edges 7, 8. A distance between the lateral side edges 7, 8 of the carrier liner 6 defines a width of the carrier liner. The carrier liner 6 may be flexible in character, and preferably although not necessarily has a degree of flexibility that is relatively greater than a degree of flexibility of the label structures 10 that are mounted thereon.

A plurality of the label structures 10 may be positioned on the carrier liner 6, and may be positioned in a line along the longitudinal axis of the liner, and may be oriented in a single file on the liner. Each label structure 10 may have an adhesive on a back face of the structure 10, and may utilize a pressure sensitive adhesive, although other adhesives may be employed.

Figure 7:
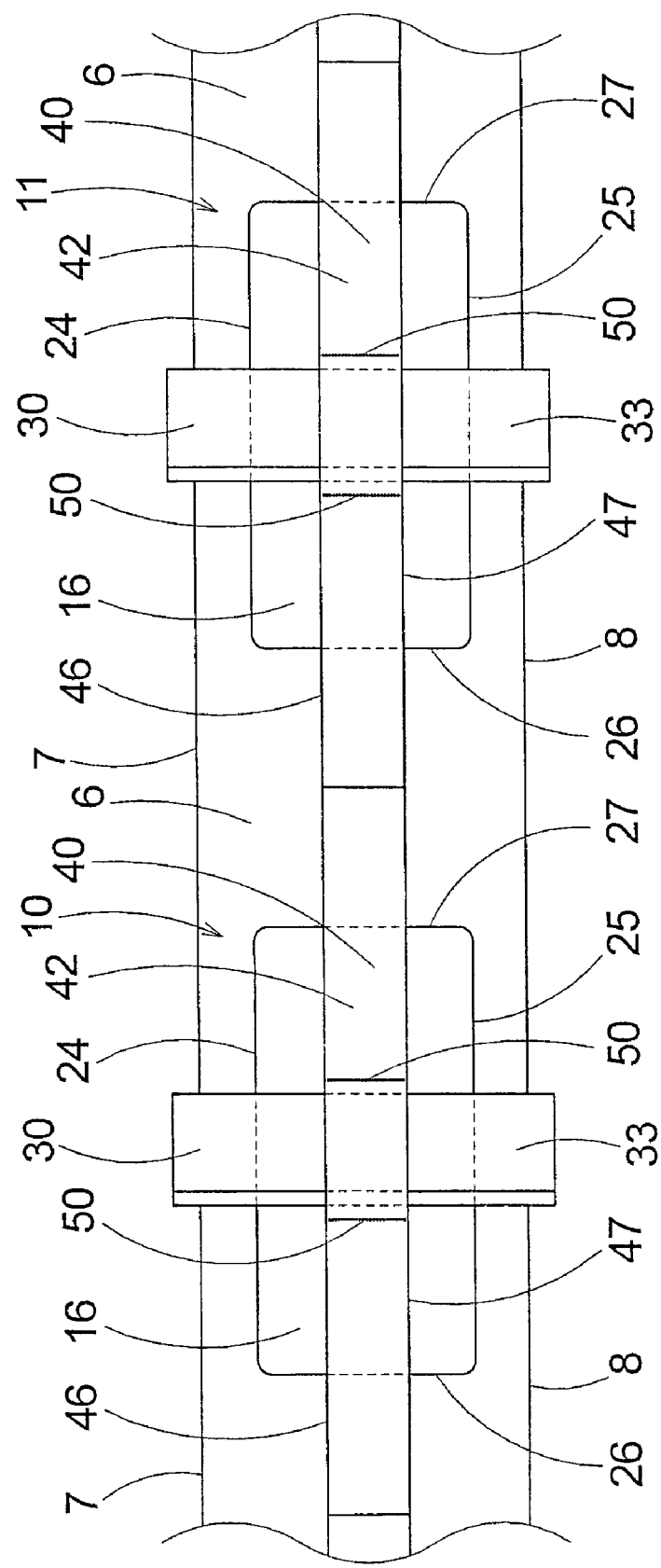
FIG. 7 is a schematic front view of a series of label structures of the type shown in FIG. 1 carried on a carrier liner.

As generally shown in FIG. 1, each label structure 10 of the plurality of label structures that may be positioned on a carrier liner 6 may comprise a base panel 16, a leaflet 30, and a laminating strip 40. As shown in FIG. 7, a series of a plurality of the label structures 10, 11 may be formed and carried on the carrier liner 6.

The base panel 16 is provided for affixing to a surface of the container 1, such as on the perimeter wall 4 of the container. The base panel 16 has a front face 18 and a rear face 20. The front face 18 may have markings thereon that communicate, for example, information about the contents of the container, although the presence of such markings on the base panel is not critical to the invention. An adhesive 22 may be applied to at least a portion of the rear face 20 of the base panel 16 to adhere at least a portion of the base panel to the container 1. The base panel 16 has a pair of side edges 24, 25 for positioning substantially parallel to the lateral side edges 7, 8 of the carrier liner 6. A distance between the side edges 24, 25 defines a width of the base panel 16. The base panel 16 has a pair of end edges 26, 27 and may be elongated with a longitudinal axis. In embodiments where the base panel 16 is elongated, the longitudinal axis of the panel 16 may be oriented substantially parallel to the longitudinal axis of the carrier liner 6 (although this is not a critical alignment), and the end edges 26, 27 of the panel 16 may be oriented substantially perpendicular to the longitudinal axis of the liner 6.

The leaflet 30 is associated with the base panel 16 for application to the container 1 with the base panel. The leaflet 30 may comprise at least one panel and has opposite exposed faces 32, 33, with a rearward one 32 of the faces facing rearwardly and being directed toward the container when the label structure 10 is applied to the container 1, and a forward one 33 of the faces facing forwardly and being directed away from the container 1 when the structure 10 is applied to a container 1. The leaflet 30 may include markings such as text that provides further information about the contents of the container 1. The leaflet 30 has a width dimension that may be measured along an axis oriented substantially perpendicular to the longitudinal axis of the base panel 16. The leaflet 30 has a top edge 34 and a bottom edge 35, and the width dimension of the leaflet is defined between the top 34 and bottom 35 edges. The leaflet 30 may be considered to be an outsert that is positioned on the outside of the container or packaging of the container, rather than being an insert that is positioned within the container or within other packaging of the product.

In some embodiments of the invention, the leaflet 30 overlies or covers at least a portion of the base panel 16. In this configuration, the leaflet 30 is positioned adjacent to the front face 18 of the base panel, and the rearward face 32 of the leaflet faces the front face 18 of the base panel. In other embodiments of the invention, the leaflet 30 does not overlie the base panel 16, and is positioned adjacent to, and optionally spaced from, one of the end edges 26, 27 of the base panel 16. In this configuration, the leaflet overlies the carrier liner 6 when the label structure 10 is attached to the liner 6. Upon positioning of the label structure 10 on the container 1, such as after the structure 10 has been removed from the liner 6, the leaflet 30 may be positioned directly or substantially directly adjacent to the surface of the perimeter wall 4 of the container 1. In embodiments where the leaflet 30 is positioned adjacent to the base panel 16, the leaflet does not block the visibility of information marked on the front face 18 of the base panel.

In some embodiments, the leaflet 30 comprises a single sheet that forms the at least one panel of the leaflet. Optionally, the single sheet may be folded upon itself one or more times to reduce the size of the profile of the folded leaflet, so that relatively more information may be printed upon the leaflet while still allowing the leaflet to suitable to be mounted on relatively small containers. In other embodiments, the leaflet 30 may comprise a plurality of sheets that form the at least one panel of the leaflet. The plurality of sheets of the leaflet 30 may be arranged in a nested relationship with respect to each other to form a booklet, and the plurality of sheets of the booklet may be connected together.

The laminating strip 40 of the label structure 10 secures the leaflet 30 to the container 1, and may secure the leaflet to the base panel 16. The laminating strip 40 may include a front face 42 and a rear face 42. The rear face 43 of the laminating strip 40 may be adhered to at least a portion of the base panel 16, such as on the front face 18 of the panel 16. The rear face 43 of the strip 40 may also be adhered at least a portion of the leaflet, and the rear face may be adhered to at least a portion of the carrier liner 6 when the liner is employed. An adhesive 44 may be applied to at least a portion of the rear face 43 of the laminating strip 40. The laminating strip 40 has side edges 46, 47 that define a width of the laminating strip therebetween. The laminating strip 40 also has end edges 48, 49 that extend between the side edges 46, 47 of the strip 40. The laminating strip 40 may extend between adjacent label structures 10, 11 on the carrier liner 6 (as shown in FIG. 7), and the end edges 48, 49 may be formed by a butt cut that severs the otherwise continuous laminating strip 40 into segments for each label structure. In other embodiments, the laminating strip 40 of one label structure may be spaced or separated from the laminating strip 40 of an adjacent label structure.

The laminating strip 40 overlies at least a portion of the base panel 16. The laminating strip 40 may be formed of a transparent or translucent material that permits markings on the front face of the base panel 16 to be viewed through the strip 40 (although this characteristic is not critical). The laminating strip 40 has a length defined between the end edges 48, 49 of the laminating strip 40, and the base panel 16 may have a length defined between the end edges 26, 27 of the base panel. In some of the most preferred embodiments of the invention, the length of the laminating strip 40 may be greater than the length of the base panel 16, and the strip 40 thus extends beyond the end edges 24, 25 of the base panel 16 so that portions of the laminating strip 40 extend beyond the end edges 24, 25. These end portions of the strip 40 may be adhered to the carrier liner 6 when the label structure 10 is adhered to the liner 6. The extent of the laminating strip 40 beyond the end edge of the base panel may be relatively minimal, such as a distance of 1/16 of an inch, or may be longer. It will be recognized by those skilled in the art that the "peelability" of the label structure 10 from the carrier liner 6 by automated means may be enhanced by a smaller extension beyond the end edge.

In some embodiments of the invention, the laminating strip 40 secures the leaflet 40 in a position overlying the base panel 16. In other embodiments, the laminating strip 40 secures the leaflet 30 directly to the carrier liner 6 without the base panel 16 being situated between the leaflet 30 and the carrier liner 6.

In some embodiments, the width of the laminating strip is less than the width of the base panel 16, although in other embodiments the width of the strip 40 may be greater than the width of the panel 16. The laminating strip 40 may be employed primarily for securing the leaflet 30, and in those applications the width of the strip 40 may be minimized to, for example, facilitate the removal of the leaflet 30 from the label structure 10. In other applications, the laminating strip 40 may further have a protective function and may be widened to a width that approaches the width of the base panel 16.

Optionally, the laminating strip 40 may include areas of weakness, such as perforations 50 extending therethrough, that facilitate the tearing of the laminating strip 40 when pressure is applied by the fingers of a person. The perforations 50 produce a location or line of relative weakness of the laminating strip 40 that permits the strip 40 to be more easily torn at the location of weakness when the hand of a person pulls the leaflet 30 away from the container 1 on which the label structure is mounted. In embodiments in which the leaflet 40 is secured to the base panel 16 by the laminating strip 40, the perforations 50 in the laminating strip 40 may be configured or arranged to permit the leaflet 30 to be released from the base panel when torn. The perforations 50 may be arranged in a single line that is positioned adjacent to a side of the leaflet 30, and optionally a line of the perforations 50 may be located in two lines, with each line being located to a side of the leaflet. In embodiments where the leaflet 30 is secured directly to the container 1 by the laminating strip 40, the perforations 50 in the laminating strip may be configured to permit the leaflet to be released from the container when the leaflet structure 10 is applied to the container.

As a further option, or as an alternative to the use of perforations, the laminating strip 40 may include a notch 54 in one of the side edges 46, 47 of the laminating strip adjacent to the leaflet 30 to facilitate tearing of the laminating strip at the leaflet. Optionally, a pair of the notches 54 may be employed, with the notches being located at either side of the location of the position of the leaflet 30 on the laminating strip 40. Similar to the perforations, the notch 54 or notches provide a location of relative weakness of the laminating strip 40 that permits the strip 40 to be more easily torn at the location of weakness when the hand of a person pulls the leaflet 30 away from the container 1 on which the label structure is mounted.

In some highly preferred embodiments of the invention, the width dimension of the leaflet 30 is greater than, and in some case significantly greater than, the width of the base panel 16. This relationship is highly advantageous in that a relatively greater amount of information may be carried by the leaflet 30 with a greater width than, for example, a leaflet having a width that is the same or less than the width of the base panel. The width of the leaflet 30 may be limited only by the height of the container 1 to which the label structure 10 is to be applied, and the width of the leaflet 30 may be offset from or eccentric with respect to the width of the base panel 16. It should be noted that a conventional step of die cutting the leaflet 30 and the base panel 16 at the same time may not be suitable for embodiments in which the leaflet 30 has a width greater than the width of the base panel 16, and typically die cut trimming of the base panel will occur prior to the application of the leaflet 30 and the laminating strip 40 to the base panel 16 when forming the label structure 10. It should be recognized that the width dimension of the leaflet 30 may be less then the width of the base panel 16, although the capacity of the leaflet to hold information will be decreased.

The width dimension of the leaflet 30 may also be greater than the width of the laminating strip 40. In some embodiments, the width dimension of the leaflet 30 may also be greater than the width of the carrier liner 6. The greater the width of the leaflet 30 relative to the width of the laminating strip 40, the easier it may be for a user to grasp an end portion of the leaflet and pull on the leaflet to separate the leaflet from the remainder of the label structure 10.

The adhering of the various parts of the label structure, and of the label structure to the carrier liner, may be accomplished using an adhesive such as a pressure sensitive adhesive. Optionally, other methods and manners of adhering or bonding the various parts together may be employed, including methods that do not use a separate adhesive.

Optionally, the leaflet 30 may be adhered to the front face of the base panel 16 (in addition to the securing provided by the laminating strip 40). Preferably, the amount of adhesive utilized between the leaflet 30 and the base panel 16 may be minimized due to the presence of the laminating strip 40, which facilitates the removal of the leaflet.

The label structure 10 of the invention permits a label to incorporate a leaflet 30 that may be relatively large for the size of the base panel 16, as the base panel may be sized to fit on the relatively small available surface of the perimeter wall of the container. In those embodiments in which the width dimension of the leaflet exceeds the width of the base panel 16, the size of the leaflet 30 is thus not limited to the size of the base panel or even the size of the surfaces of the container, but can exceed the size of that surface. Significantly, the leaflet 30 may be incorporated into the overall label structure 10 during the process of the assembling the label structure, and thus the leaflet does not have to be applied after a label has been applied to the container. The integrity of the label structure may thus be verified before the label structure is applied to the container, and the need to perform reconciliation procedures may be eliminated, particularly after the label structure has been applied to the container.

Figure 8:
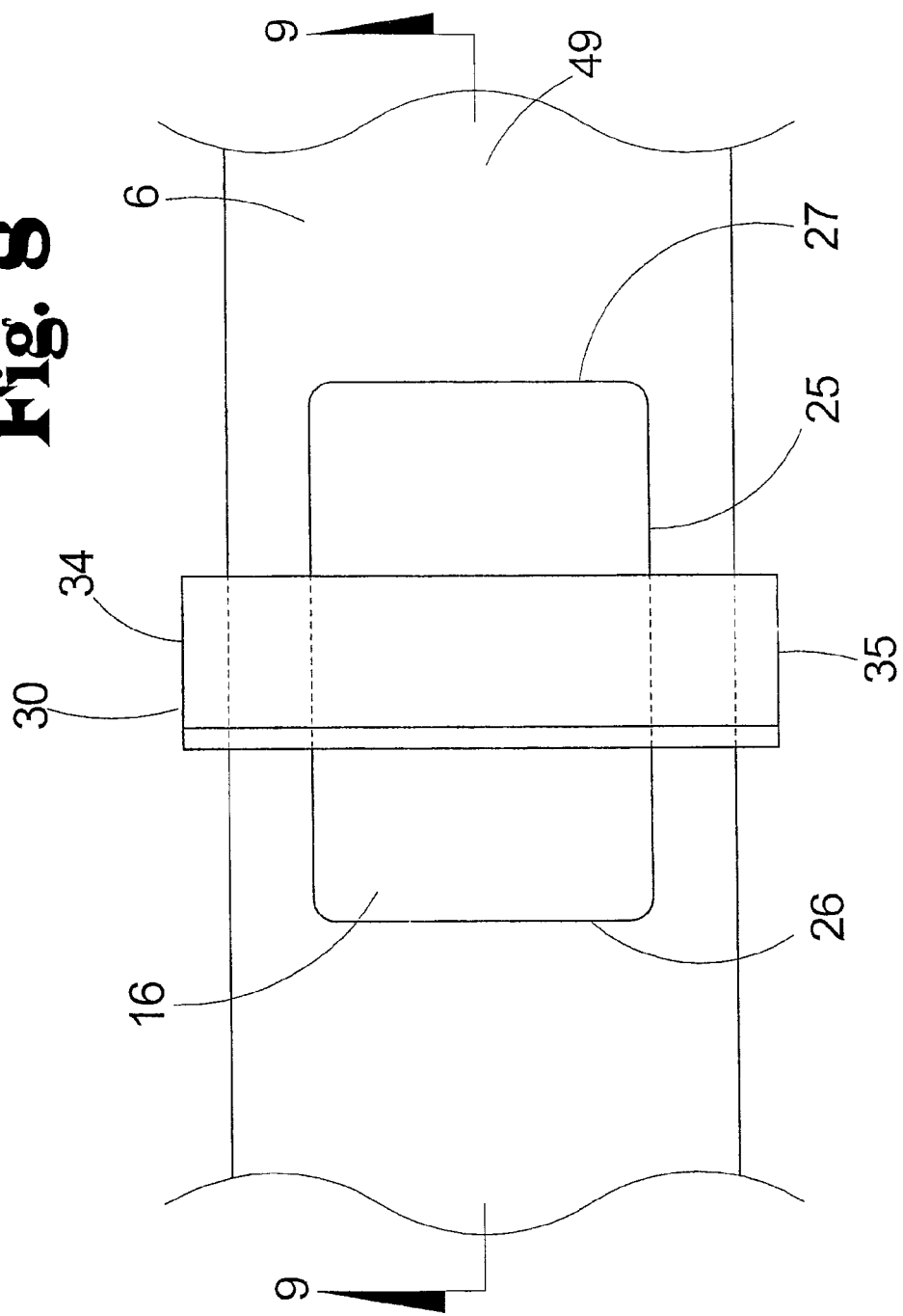
FIG. 8 is a schematic front view of another embodiment of the present invention.
Figure 9:
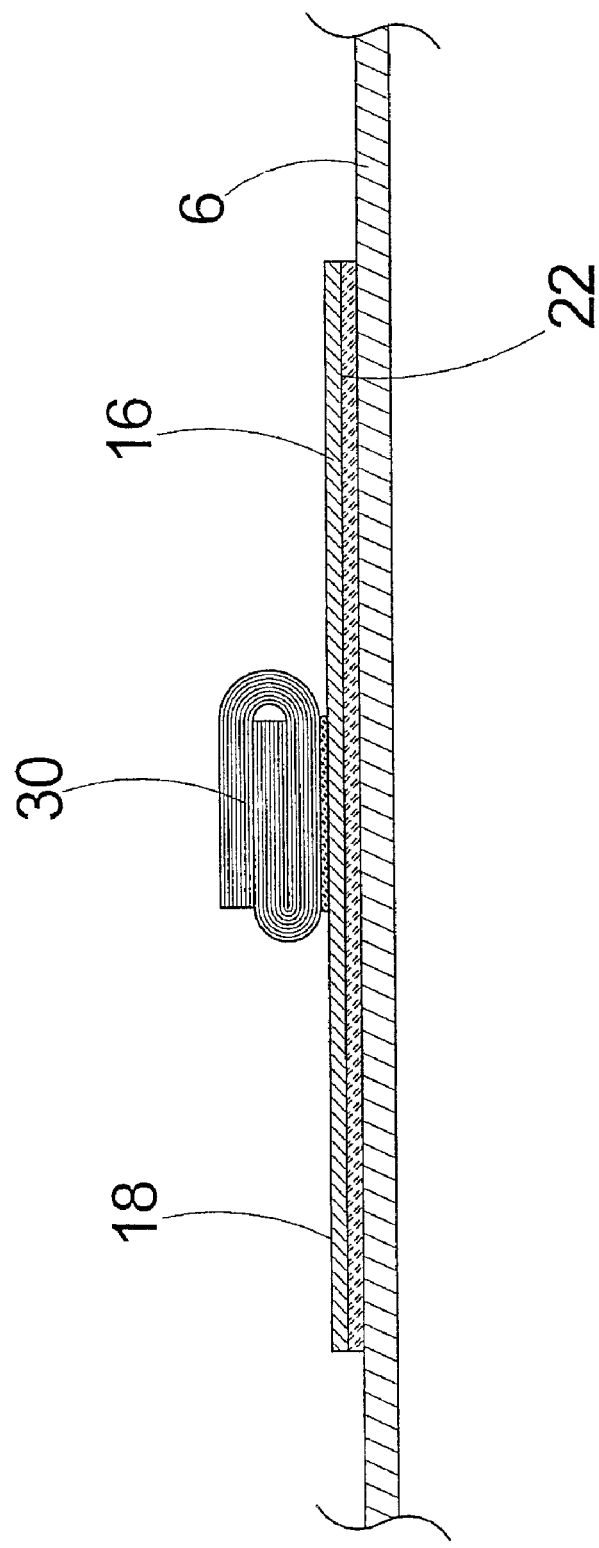
FIG. 9 is a schematic sectional view of the embodiment of the present invention shown in FIG. 8 taken along line 9-9 of FIG. 8.
Figure 10:
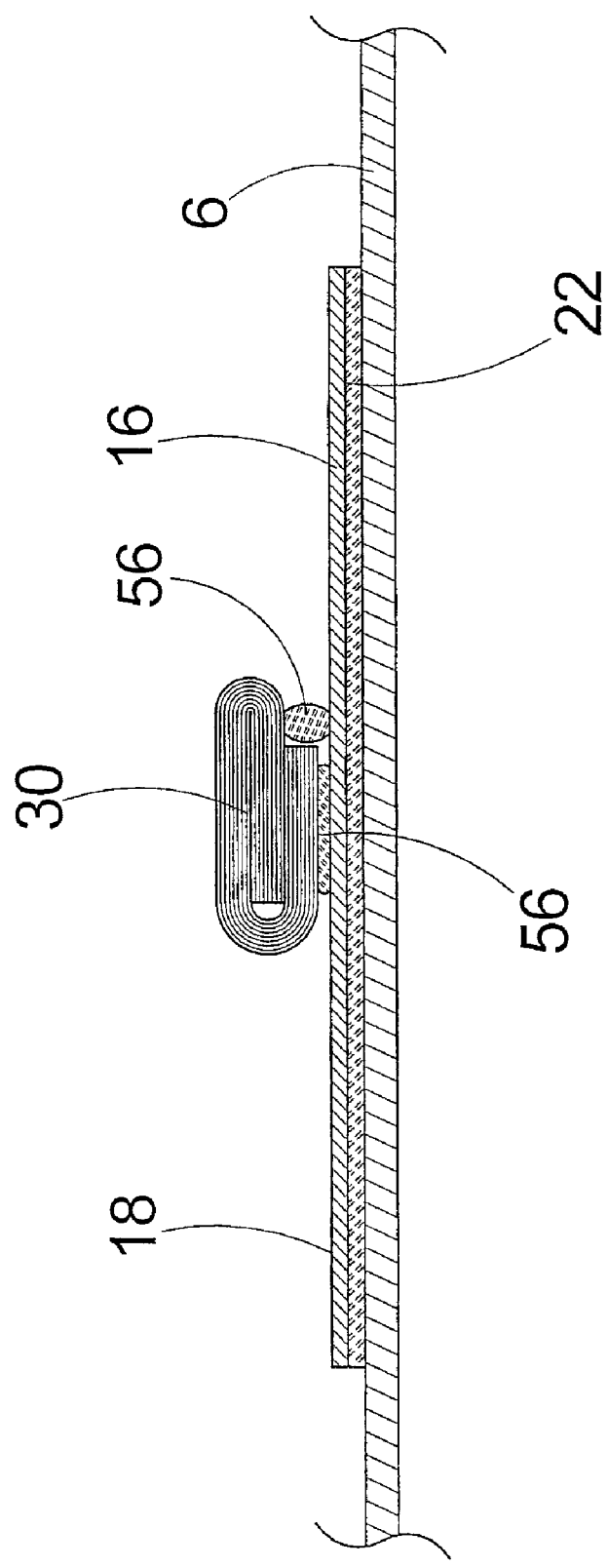
FIG. 10 is a schematic sectional view of a variation of the embodiment of the present invention shown in FIG. 8.

In an optional configuration of the invention, which is illustratively shown in FIGS. 8 through 10, the leaflet 30 is positioned adjacent to the front face 18 of the base panel 16, and is adhered to the front face 18 by an adhesive 56. Preferably, the adhesive 56 is limited to a relatively small area such as a small spot (such as shown in FIG. 9) or spots (such as is shown in FIG. 10) that are spaced from each other to permit the leaflet top be removed from the front face 18 of the base panel 16 by applying finger force to pull on the leaflet in a direction away from the base panel. Spaced dots or areas of adhesive 56 may be employed to adhere different areas of the leaflet 30 to the base panel 16 to, for example, a middle portion of the folded panel forming the leaflet and an end portion of the panel forming the leaflet. This variation of the invention may thus be implemented without including the laminating strip 40. It should be recognized that the shape of the area of adhesive may vary, and may for example, may have a larger expanse such as the area of adhesive 56 shown in FIG. 18 of the drawings. The area of adhesive may have a substantially rectangular shape that approximates the shape of the portion of the leaflet 30 that overlies the front face 18 of the base panel 16. The use of a larger area of adhesive 56 may permit the use of an adhesive that is not as aggressive or "sticky" as might otherwise be needed if smaller areas of adhesive are used, which may enhance the ability to peel the leaflet 30 from the base panel 16 without tearing the material of the leaflet.

Figure 11:
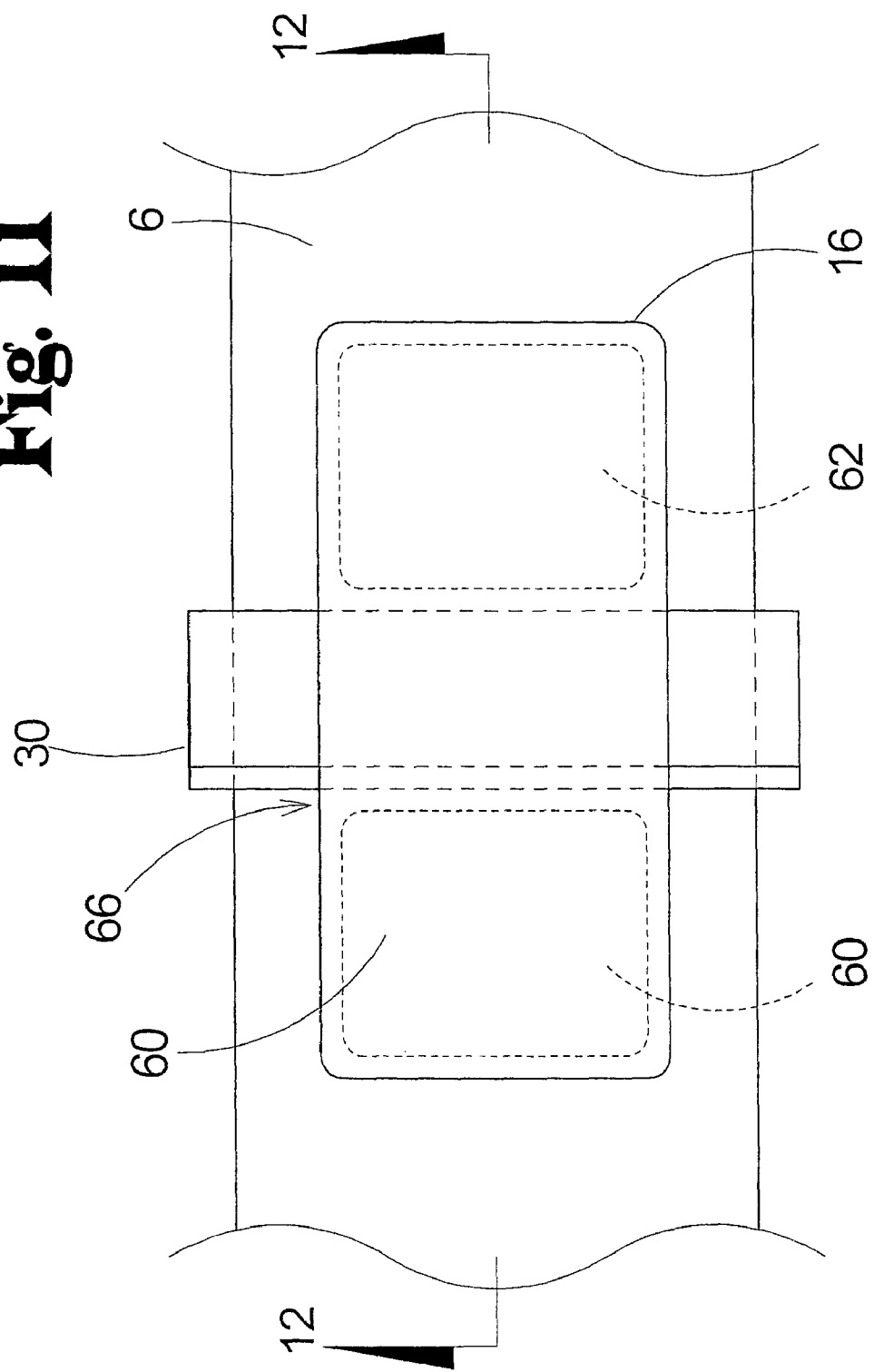
FIG. 11 is a schematic front view of another embodiment of the present invention.
Figure 12:
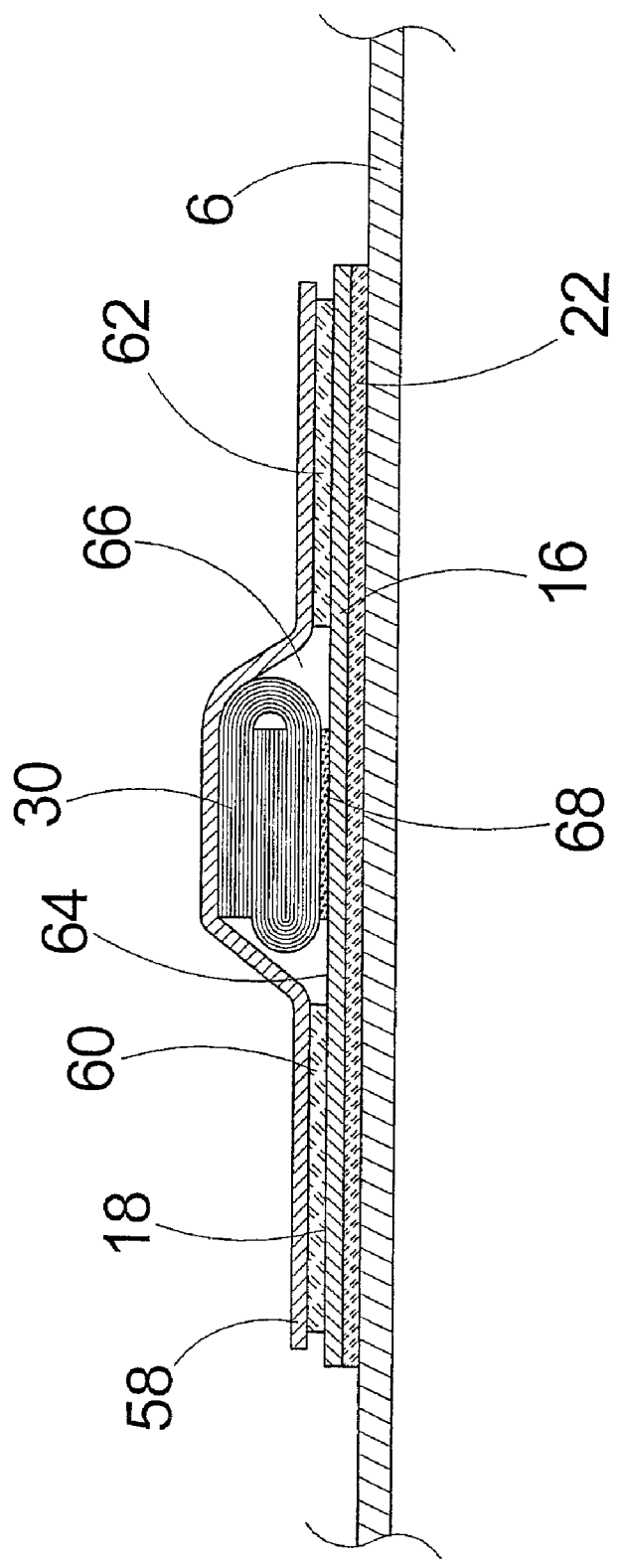
FIG. 12 is a schematic sectional view of the embodiment of the present invention shown in FIG. 11 taken along line 12-12 of FIG. 11.

In another optional configuration of the invention, which is illustratively shown in FIGS. 11 and 12, the leaflet 30 is positioned adjacent to the front face 18 of the base panel 16, and a laminating panel 58 is positioned over the leaflet and a portion of the front face of the base panel. In this optional configuration, areas 60, 62 of the front face 18 of the base panel 16 may have adhesive applied thereon for adhering the laminating panel 58 to the base panel 16. An area 64 of the front face 18 of the base panel 16 is substantially free of adhesive adhering the laminating panel 58 to the base panel to form a pocket or channel 66 between the base and laminating panels for receiving the leaflet 30. The leaflet 30 may be pulled from the channel 66, particularly when the width of the leaflet is greater than a width of the laminating panel 58 and a portion of the leaflet 30 protrudes from the channel for finger-gripping. Optionally, a small amount of adhesive 68 may be positioned between the leaflet 30 and base panel 16 to provide a small amount of resistance for the leaflet to inadvertent movement or removal of the leaflet from the channel 66 without applying some degree of force to remove the leaflet from the channel.

Figure 13:
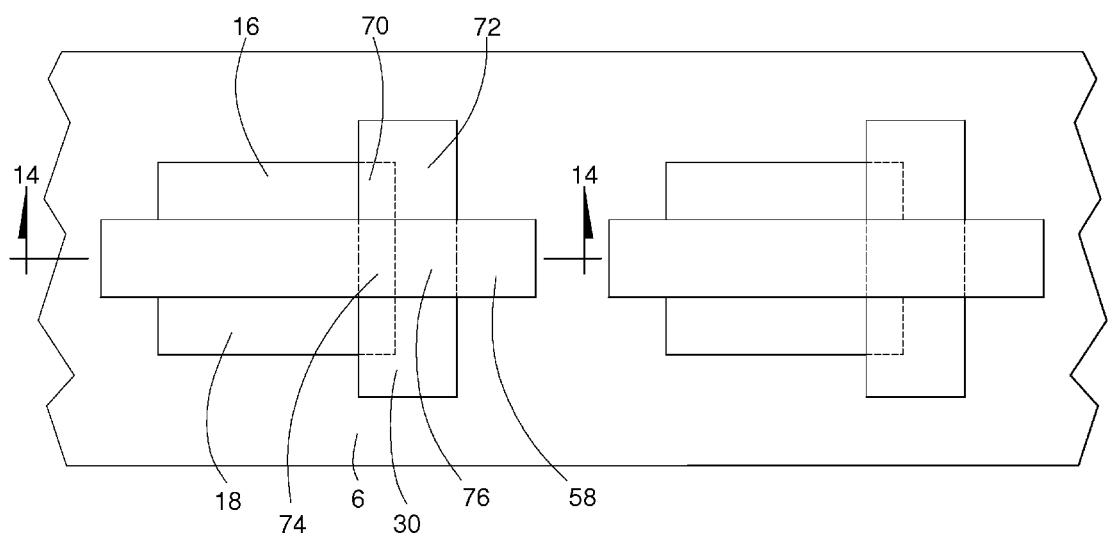
FIG. 13 is a schematic front view of another embodiment of the present invention.
Figure 14:
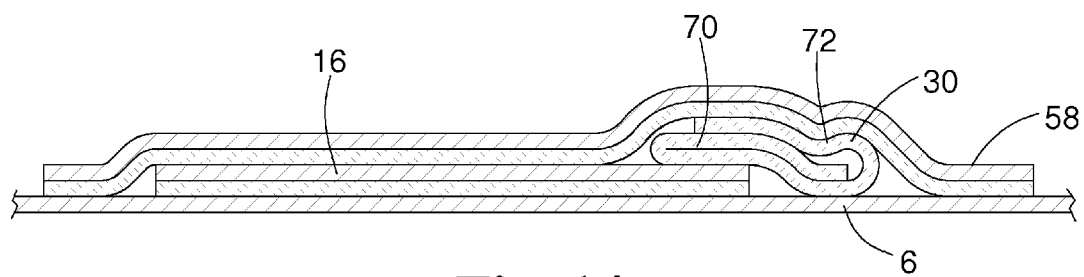
FIG. 14 is a schematic sectional view of the embodiment of the present invention shown in FIG. 13 taken along line 14-14 of FIG. 13.

In yet another optional configuration of the invention, which is illustratively shown in FIGS. 13 and 14, a first portion 70 of the leaflet 30 overlies the base panel while another (second) portion 72 of the leaflet does not overlie the base panel. The first portion 70 of the leaflet 30 may overlie the front face 18 of the base panel 16, and the second portion 72 of the leaflet does not overlie the base panel 16. The first portion 70 may directly overlie and contact the front face 18 of the base panel. The laminating strip 58 overlies the leaflet 30, and a first section 74 of the leaflet that is overlain by the laminating strip 58 may in turn overlie the base panel 16, and a second section 76 of the leaflet overlain by the laminating strip 58 does not overlie the base panel. In this context, overlie may be defined as being positioned directly above, with or without an intervening element, when the label structure is positioned with the rear face 20 of the base panel 16 oriented in a downward direction and the front face 18 is oriented in an upward direction.

Figure 15:
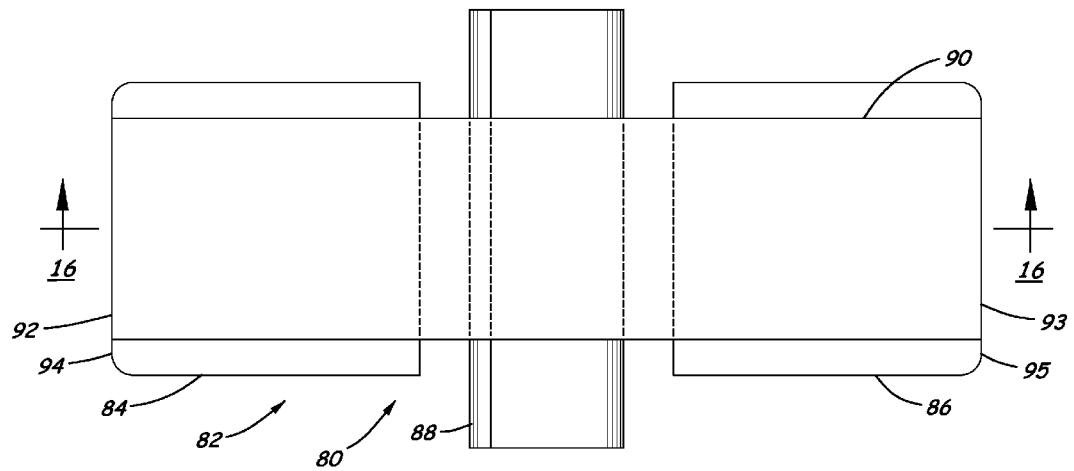
FIG. 15 is a schematic front view of another embodiment of the present invention.
Figure 16:
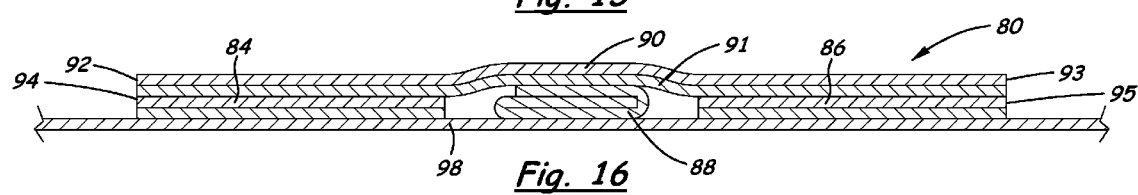
FIG. 16 is a schematic sectional view of the embodiment of the present invention shown in FIG. 15 taken along line 16-16 of FIG. 15.
Figure 17:
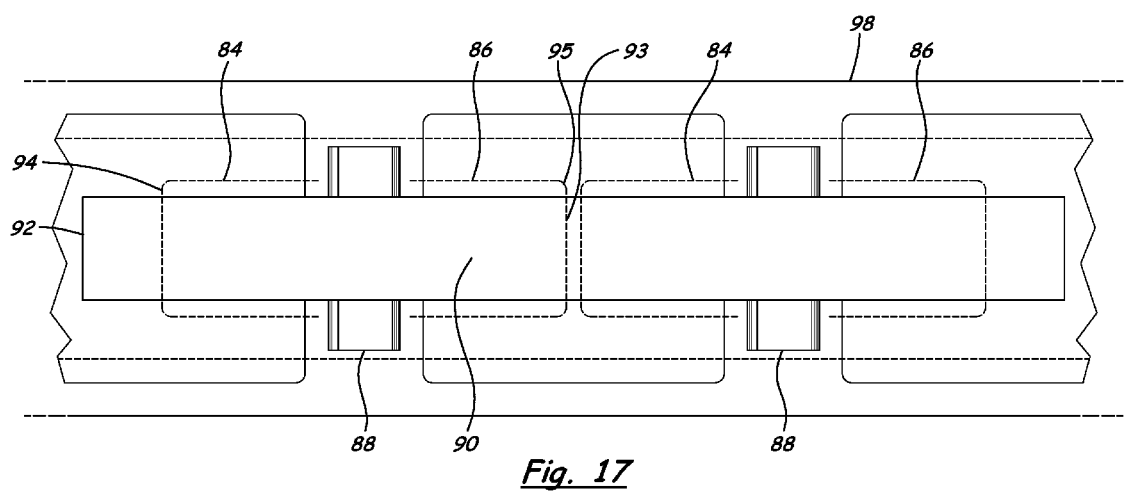
FIG. 17 is a schematic front view of a series of label structures of the type shown in FIG. 15 as carried on a carrier liner prior to final trimming of waste from the label structures.
Figure 18:
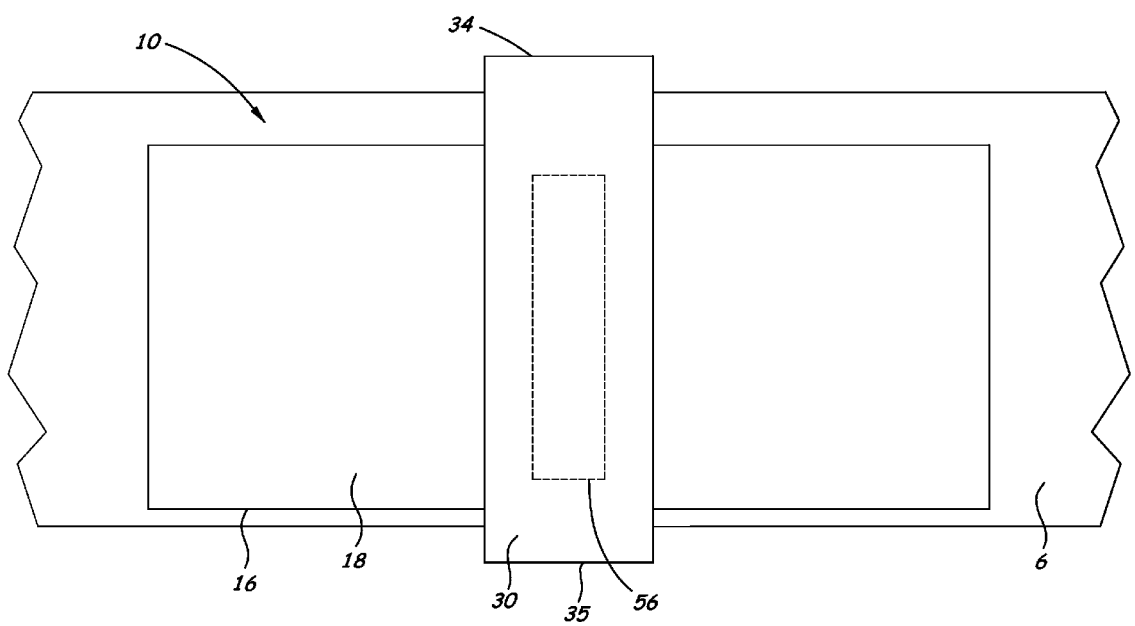
FIG. 18 is a schematic front view of another embodiment of the label structure.
Figure 19:
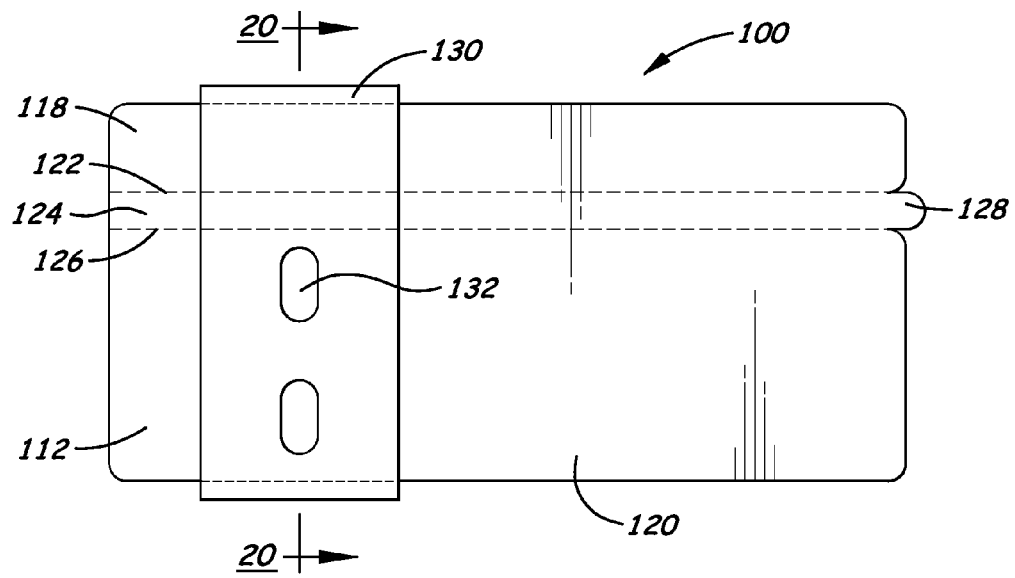
FIG. 19 is a schematic front view of another embodiment of the label structure.
Figure 20:
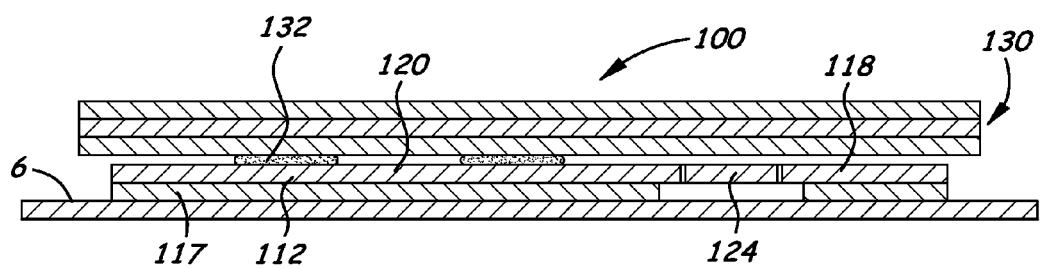
FIG. 20 is a schematic sectional view of the embodiment of the label structure shown in FIG. 19 taken along line 20-20 of FIG. 19.
Figure 21:
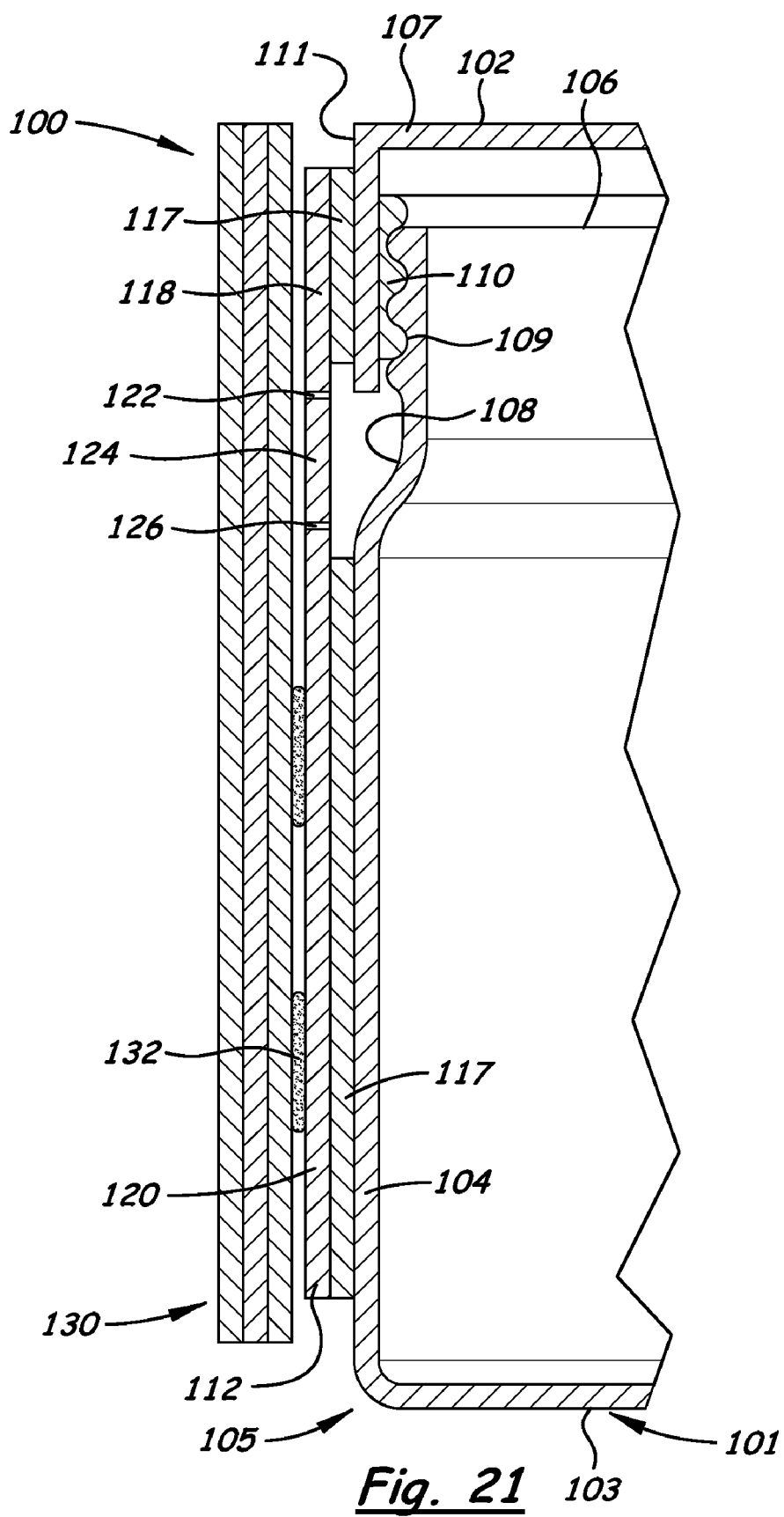
FIG. 21 is a schematic sectional view of the embodiment of the label structure shown in FIG. 19 shown mounted on a container.
Figure 22:
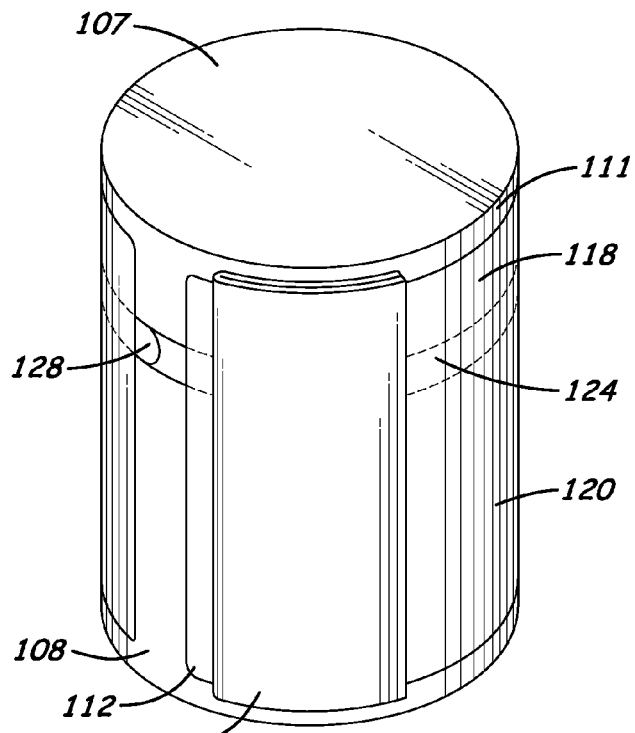
FIG. 22 is a schematic perspective view of the embodiment of FIG. 18 shown on a container.
Figure 23:
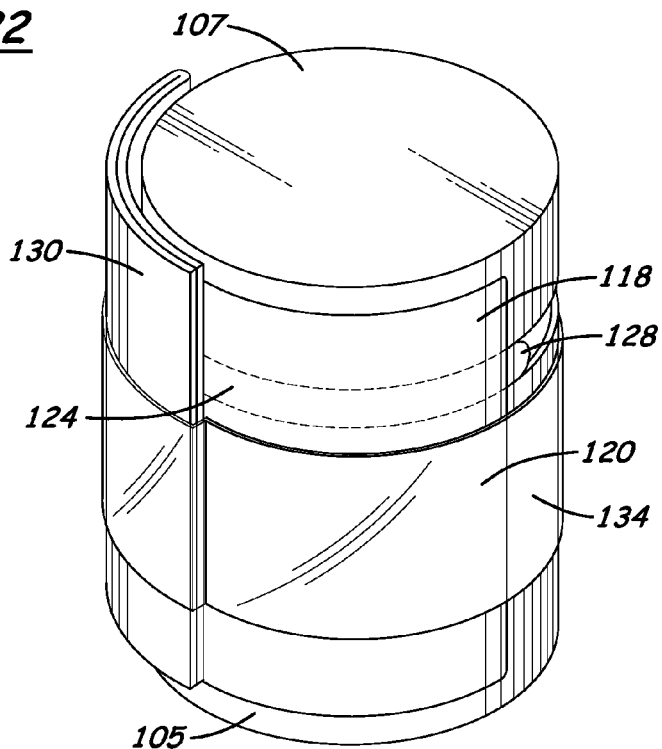
FIG. 23 is a schematic perspective view of a variation of the embodiment of FIG. 18 shown on a container, which includes a laminating strip.

As illustratively shown in FIGS. 15 through 17, yet another configuration of a label structure 80 is disclosed that the label structure having a longitudinal axis and a lateral axis. The label structure 80 (see FIG. 15) may include a multi piece base panel 82 for affixing to a surface of the container and that may include a first base panel portion 84 and a second base panel portion 86. Each of the base panel portions 84, 86 may have a front face and a rear face, and an adhesive being applied to at least a portion of the rear face of each of the base panel portions for adhering the base panel to the container. The first base panel portion 84 may be spaced from the second panel portion 86, and may form a gap 87 or space between the first 84 and second 86 base panel portions. The first and second base panel portions may be spaced from each other along the longitudinal axis of the label structure.

The label structure 80 further includes a leaflet 88 in association with the base panel 82 for application to the container with the multi-piece base panel 82. The leaflet 88 may be positioned partially or entirely in the gap 87 between the base panel portions 84, 86, so that the leaflet does not overlie either of the base panel portions 84, 86, or overlies a portion of one or both of the base panel portions 84, 86. The leaflet 88 may be elongated in a direction that is oriented substantially perpendicular to the longitudinal axis. The leaflet 88 may comprise at least one panel with opposite faces, and may comprise one or more panels that are folded together, or more than one panels that are attached together such as by stapling or bonding.

A laminating strip 90 secures the leaflet 88 to the multi-piece base panel 82. The laminating strip 90 may overlie the leaflet 88 and may also overlie the base panel 82, such as, for example, the first base panel portion 84 and the second base panel portion 86. In some preferred embodiments, such as the embodiment illustrated in FIG. 15, the laminating strip 90 overlies both the first base panel portion 84 and the second base panel portion 86. The laminating strip 90 may extend continuously between the first 84 and second 86 base panel portions so that the laminating strip in essence bridges the gap 87 between the base panel portions 84, 86. In some embodiments, the laminating strip 90 has an adhesive 91 applied to the face of the laminating strip that is oriented toward the multi-piece base panel 83 and the leaflet 88, so that the laminating strip is adhered to the leaflet and the base panel. The laminating strip 90 may include features that facilitate the tearing of the laminating strip to release the leaflet, such as, for example, the aforedescribed perforations or notches, as well as any other suitable device to accomplish this purpose. The laminating strip 90 may have longitudinal end edges 92, 93 which have positions that correspond to the positions of the outer longitudinal edges 94, 95 of the first 84 and the second 86 base panel portions.

FIG. 17 shows an intermediate assembly form of the label structure 80 positioned on a carrier or liner 98 prior to final trimming of the parts of the label structure. FIG. 17 shows a series of the label structures 80 being formed on a carrier liner 98. The broken lines represent the cut or trim lines that may be made in any suitable manner, such as, for example, by die cutting. It can be seen that one of the base panel portions for two adjacent label structures may be formed from the same piece of base panel material. Furthermore, the final trimming of the base panel material and the laminate may be accomplished after the leaflet has been added to the assembly of label structure parts. Advantageously, the trimming of the laminate strip may be accomplished at the same time and in the same cutting action as the trimming of the base panel material. The trimming of the ends of the laminating strip may be facilitated by the cutting of the laminating strip 90 with the base panel material, since it may be easier to trim the relatively thinner laminating strip with the relatively thicker base panel material. Also, peeling of the label structure 80 from the carrier liner 98 may also be facilitated by the correspondence of the end edge of the laminating strip 90 with the edge of the base panel portion.

In still another optional configuration, a label structure 100 is provided for mounting on a container 101 (see FIGS. 19 through 23) with a top 102 and a bottom 103. A perimeter wall 104 forms a container body 105 of the container 101 with an opening 106, and a cap 107 removably closes the opening. The opening is located at a top of the container body 105, and the perimeter wall 104 has an exterior surface 108, and a portion of the perimeter wall located adjacent to the opening 106 has exterior threads 109 formed thereon. The cap 107 may have interior threads 110 formed thereon for removably engaging the exterior threads 109 of the container body. The cap 107 has an exterior surface 111 which may be substantially cylindrical in shape.

The label structure 100 may comprise a base panel 112 for affixing to the exterior surfaces 108, 111 of the container 101. The base panel 112 may be configured to be affixed to the container body 105 and the cap 107 such that the base panel 112 bridges any gap between the exterior surfaces 108, 11 of the container body 105 and the cap 107. The base panel 112 has a front face 114 and a rear face 116, and an adhesive 117 may be applied to at least a portion of the rear face 116 of the base panel for adhering the base panel to the container.

In some embodiments, the base panel 112 may include an upper portion 118 and a lower portion 120. The upper portion 118 may be configured to be positioned adjacent to the cap 107 and the lower portion 102 may be configured to be positioned adjacent to the container body 105 when the label structure is attached on the container. Adhesive may be applied to at least a portion of the upper portion 118 for affixing the upper portion to the cap and may be applied to at least a portion of the lower portion 102 for affixing the lower portion to the container body.

The base panel 112 may have a line of perforations 122 that extend between the upper 118 and lower 120 portions of the panel 112 to permit separation of the upper and lower portions of the base panel from each other. Separation of the portions 118, 120 of the base panel 112 permits removal of the cap 107 from the container body 105, such as by permitting the rotation of the cap with respect to the body such that the threads of the parts are able to disengage from each other.

In some embodiments, the base panel 112 may also include a removable portion 124 that is removable from other portions of the base panel, such as the upper 118 and lower 120 portions. The removable portion 124 may be positioned between the upper and lower portions. The removable portion 124 may be defined by the first line 122 of perforations and a second line 126 of perforations, with the first line separating the removable portion from the upper portion and the second line 126 separating the removable portion from the lower portion. The removable portion of the base panel is thus removable from the upper and lower portions by tearing the base panel along the lines 122, 126 of perforations, and thereby releasing the connection between the upper and lower portions of the base label so that the portions 118, 120 may be moved in different directions. The lines 122, 126 may be spaced from each other and may be oriented substantially parallel to each other.

The removable portion 124 of the base panel may be free of the adhesive that is located on the upper and lower portions of the panel 112. The removable portion may also be formed with a tab 128 that extends outwardly beyond the upper and lower portions to facilitate grasping of the end of the removable portion by the fingers of the user for pulling the removable portion away from the other portions.

The portions of the base panel may have widths that correspond to the respective heights of the parts of the container. For example, the upper portion may have a width that generally corresponds to (or at least is less than) the height of the cap, and the lower portion may have a width that generally corresponds to (or again is at least less than) the height of the container body. The width of the removable portion may generally correspond to the width of the gap between the exterior surface 111 of the cap and the exterior surface 108 of the container body.

A significant feature of the label structure 100 is a leaflet 130 that is associated with the base panel 112 for application to the container 101 with the base panel. The leaflet 130 may comprise at least one panel with opposite faces, and the panel(s) may be folded once or more, or may comprise a plurality of panels that are attached together, such as by stapling or bonding. The leaflet 130 may overlie the base panel 112, and may be positioned adjacent to the front face 114 of the base panel. The leaflet 130 may extend over portions of the upper and lower portions of the base panel, as well as the removable portion where employed.

The leaflet 130 may be secured to the base panel 112, and is preferably removably secured to the base panel to permit removal and review of the contents of the leaflet by a user of the container. In some embodiments, adhesive 132 is employed to secure the leaflet 130 to the base panel 112. The adhesive 132 may be positioned between the leaflet 130 and the front face 114 of the base panel to adhere the leaflet to the front face. The adhesive 132 may be positioned between the leaflet and the lower portion of the base panel, such that the leaflet is secured to the lower portion but not directly to the upper portion or the removable portion. Thus, it may be possible to remove the removable portion of the base panel from the label structure and the leaflet may remain on the lower portion, and the cap may be rotatable with respect to the container body with the leaflet in place on the lower portion. In other embodiments, the adhesive may also, or alternatively, secure the leaflet to the upper portion and/or the removable portion of the base panel, although such structures are less preferred. A single spot of adhesive may be employed, or multiple areas of adhesive may be utilized.

In other embodiments, a laminating strip 134 may be employed to secure the leaflet 130 to the base panel 112. The laminating strip 134 may overlie the leaflet 130 and may also overlie a portion of the base panel. In some embodiments, the laminating strip 134 may overlie only the lower portion 120 of the base panel, and may not extend over the upper portion or the removable portion, although in other embodiments the laminating strip may extend to the upper portion and the removable portion (although the presence of the laminating strip may hinder the removability of the removable portion). The laminating strip may also extend beyond the end edges of the base panel so that the laminating strip is able to contact (and be adhered to) the container. In embodiments employing the laminating strip, the leaflet 130 may not overlie the base panel 112, but may be spaced from the base panel and may be secured to the container by the laminating strip 134. In other embodiments, the laminating strip 134 may have any of the other characteristics of laminating strips set forth in this disclosure.

The leaflet 130 may have a width dimension that is measured in a direction that is oriented substantially perpendicular to the side edges of the base panel, and the lines of perforations in the base panel. In some embodiments, the width of the leaflet 130 may be greater than the base panel, such that the leaflet extends beyond the side edges of the base panel when attached to the base panel. In some embodiments, the width of the leaflet may be substantially equal to the width of the base panel. In some embodiment, the width of the leaflet may exceed the width of the lower portion of the base panel, but not the width of the bale panel. In some embodiments, the width of the leaflet may exceed the combined width of the lower and removable portions, but not the width of the base panel.

It should be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A label structure for mounting on a container having a container body with an opening and a cap removably closing the opening, the label structure comprising:
    a base panel for affixing to exterior surfaces of the container, the base panel having a front face and a rear face, an adhesive being applied to at least a portion of the rear face of the base panel for adhering the base panel to the container, the base panel including an upper portion for positioning adjacent to the cap of the container and a lower portion for positioning adjacent to the container body of the container; and
    a leaflet secured to the base panel for application to the container with the base panel, the leaflet comprising at least one panel, the leaflet overlying the upper and lower portions of the base panel;
    wherein the upper portion of the base panel is separable from the lower portion of the base panel to permit removal of the cap from the container body when the upper portion is affixed to the cap and the lower portion is affixed to the container body.

2. The label structure of claim 1 wherein the adhesive is applied to at least a portion of the lower portion such that the lower portion is configured to be affixed to the container body.

3. The label structure of claim 1 wherein the adhesive is applied to at least a portion of the upper portion such that the upper portion is configured to be affixed to the cap.

4. The label structure of claim 1 wherein the base panel includes a line of perforations extending between the upper and lower portions to permit separation of the upper and lower portions of the base panel from each other.

5. The label structure of claim 1 wherein the base panel includes a removable portion removable from the base panel.

6. The label structure of claim 5 wherein the removable portion is positioned between the upper and lower portions such that removal of the removable portion separates the upper portion from the lower portion of the base panel.

7. The label structure of claim 5 wherein the base panel includes a line of perforations extending between the upper portion and the removable portion, and a line of perforations extending between the lower portion and the removable portion such that the removable portion is removable from the upper and lower portions by separating the base panel along the lines of perforations.

8. The label structure of claim 1 wherein an adhesive secures the leaflet to the base panel.

9. The label structure of claim 8 wherein the adhesive is positioned between the leaflet and the front face of the base panel to adhere the leaflet to the front face.

10. The label structure of claim 1 wherein a laminating strip secures the leaflet to the base panel, the laminating strip overlying the leaflet and overlying the base panel.

11. The label structure of claim 1 wherein the leaflet has a width dimension oriented substantially perpendicular to a longitudinal axis of the base panel, the width dimension of the leaflet being greater than a width of the base panel.

12. A label structure for mounting on a container having a container body with an opening and a cap removably closing the opening, the label structure comprising:
    a base panel for affixing to exterior surfaces of the container, the base panel having a front face and a rear face, an adhesive being applied on at least a portion of the rear face of the base panel for adhering the base panel to the container, the base panel including an upper portion positionable adjacent to the cap of the container to adhere the upper portion to the cap and a lower portion positionable adjacent to the container body of the container to adhere the lower portion to the container body;
    a leaflet secured to the base panel for application to the container with the base panel, the leaflet comprising at least two panels with a fold positioned therebetween, the leaflet overlying the front face of the upper and lower portions of the base panel;
    wherein the upper portion of the base panel is separable from the lower portion of the base panel to permit removal of the cap from the container body when the upper portion is adhered to the cap and the lower portion is adhered to the container body; and
    wherein the leaflet has a width dimension oriented substantially perpendicular to a longitudinal axis of the base panel, the width dimension of the leaflet being greater than a width of the base panel.

13. A container and label structure combination comprising:
    a container comprising a container body with an opening and a cap removably closing the opening, the container body having an exterior surface and the cap having an exterior surface; and
    a label structure on the container, the label structure comprising:
        a base panel adhered to the exterior surfaces of the container, the base panel having a front face and a rear face, an adhesive being applied to at least a portion of the rear face of the base panel and adhering the base panel to the container, the base panel including an upper portion adhered to the exterior surface of the cap of the container and a lower portion adhered to the exterior surface of the container body of the container; and a leaflet secured to the base panel, the leaflet comprising at least two panels with a fold therebetween;

wherein a line of perforations extends between the upper and lower portions to permit the upper portion of the base panel to be separable from the lower portion of the base panel to permit removal of the cap from the container body; and wherein the leaflet extends over the line of perforations.

14. The container and label structure combination of claim 13 wherein the leaflet overlies at least a portion of the upper portion and the lower portion of the base panel.

15. The container and label structure combination of claim 13 wherein leaflet is adhered to the lower portion of the base panel and is free of attachment to the upper portion of the base panel.

16. The container and label structure combination of claim 13 wherein the base panel includes a removable portion positioned between the upper and lower portions of the base panel, the removable portion being removable from the upper and lower portions of the base panel.

17. The container and label structure combination of claim 16 wherein the removable portion of the base panel extends across a gap formed between the exterior surface of the cap and the exterior surface of the container body.

18. The container and label structure combination of claim 16 wherein the removable portion is positioned between the upper and lower portions such that removal of the removable portion separates the upper portion from the lower portion of the base panel.

19. The container and label structure combination of claim 16 wherein the base panel includes a line of perforations extending between the upper portion and the removable portion, and a line of perforations extending between the lower portion and the removable portions such that the removable portion is removable from the upper and lower portions by separating the base panel along the lines of perforations.

20. The container and label structure combination of claim 13 wherein an adhesive secures the leaflet to the base panel.

* * * * *